US008011243B2

(12) United States Patent
Montanari et al.

(10) Patent No.: US 8,011,243 B2
(45) Date of Patent: Sep. 6, 2011

(54) METHOD FOR CORRECTING THE ECCENTRICITY OF A VEHICLE WHEEL IN BALANCING MACHINES OR THE LIKE

(75) Inventors: Marco Montanari, Campegine (IT); Andrea Matteucci, Correggio (IT)

(73) Assignee: Sicam S.R.L., Correggio (RE) (IT)

( * ) Notice: Subject to any disclaimer, the term of this patent is extended or adjusted under 35 U.S.C. 154(b) by 441 days.

(21) Appl. No.: 12/153,038

(22) Filed: May 13, 2008

(65) Prior Publication Data

US 2009/0145221 A1   Jun. 11, 2009

(30) Foreign Application Priority Data

May 23, 2007 (IT) .............................. MO2007A0175

(51) Int. Cl.
*G01M 1/16* (2006.01)
(52) U.S. Cl. .......................................... 73/460; 73/457
(58) Field of Classification Search .................. 73/460, 73/462, 457, 473; 301/5.21
See application file for complete search history.

(56) References Cited

U.S. PATENT DOCUMENTS

| 3,678,761 | A | * | 7/1972 | Blackburn ...................... 73/457 |
| 3,724,137 | A | * | 4/1973 | Hofelt et al. .................. 451/254 |
| 3,914,907 | A | * | 10/1975 | Hofelt et al. .................... 451/28 |
| 4,016,020 | A | * | 4/1977 | Ongaro ............................ 156/75 |
| 4,238,962 | A | * | 12/1980 | Taenzer .......................... 73/633 |
| 4,472,990 | A | * | 9/1984 | Seragnoli et al. ............. 83/174.1 |
| 5,103,595 | A |   | 4/1992 | Dale et al. |
| 5,782,324 | A | * | 7/1998 | Wall ........................... 188/218 R |
| 5,946,797 | A | * | 9/1999 | Kawabe et al. .................. 29/821 |
| 6,249,954 | B1 | * | 6/2001 | Kawabe et al. .................. 29/468 |
| 6,251,207 | B1 | * | 6/2001 | Schultz et al. ................ 156/209 |
| 6,589,634 | B2 | * | 7/2003 | Schultz et al. ............. 428/195.1 |
| 6,668,635 | B2 | * | 12/2003 | Kunsch et al. .................. 73/146 |

(Continued)

FOREIGN PATENT DOCUMENTS

WO   WO 2006/112409   10/2006

OTHER PUBLICATIONS

European Search Report issued in corresponding European Application No. 08 00 8647 on Oct. 29, 2010.

*Primary Examiner* — Hezron E Williams
*Assistant Examiner* — Samir M Shah
(74) *Attorney, Agent, or Firm* — Stein McEwen, LLP

(57) ABSTRACT

The method for correcting the eccentricity of a vehicle wheel in balancing machines or the like, comprises: a reading phase for reading the radial eccentricity deviation of the rim of a wheel to be balanced and the radial eccentricity deviation of the tire of the wheel, read at a plurality of predetermined angular positions along the entire outer perimeter of the rim and of the tire; a processing phase of the total radial eccentricity deviation values of the wheel, starting with the radial eccentricity deviations of the rim and of the tire read and according to the angular coupling positions between the rim and the tire; a definition phase for defining a geometric irregularity index of the wheel, determined according to the total radial eccentricity deviation values of the wheel and according to the angular coupling position between the rim and the tire; a determination phase for determining an optimal coupling angular position between the tire and the rim, selected among all the possible angular coupling positions, in which the value of the above mentioned index is minimum.

17 Claims, 2 Drawing Sheets

U.S. PATENT DOCUMENTS

| | | | |
|---|---|---|---|
| 6,783,188 B2* | 8/2004 | Kogure et al. | 301/35.627 |
| 6,948,246 B2* | 9/2005 | Kogure et al. | 29/894.362 |
| 2002/0155257 A1* | 10/2002 | Schultz et al. | 428/195 |
| 2003/0010105 A1 | 1/2003 | Kunsch et al. | 73/146 |
| 2003/0067211 A1* | 4/2003 | Kogure et al. | 301/35.631 |
| 2004/0003671 A1* | 1/2004 | Fervers et al. | 74/87 |
| 2004/0222687 A1* | 11/2004 | Kogure et al. | 301/35.631 |
| 2005/0055153 A1 | 3/2005 | Braghiroli | |
| 2007/0069571 A1 | 3/2007 | Matteucci et al. | |
| 2007/0277377 A1* | 12/2007 | Tosi | 29/894.35 |
| 2008/0053223 A1 | 3/2008 | Montanari | |

* cited by examiner

METHOD FOR CORRECTING THE ECCENTRICITY OF A VEHICLE WHEEL IN BALANCING MACHINES OR THE LIKE

FIELD OF THE INVENTION

This invention refers to a method for correcting the eccentricity of a vehicle wheel in balancing machines or the like.

BACKGROUND OF THE INVENTION

Vehicle wheels are, in general, made up of a metal cylindrical rim having, at its axial ends, annular flanges which define a channel for interlocking a tire. In particular, the side portions of the tire, so-called "beads", are fitted snugly on the annular flanges.

Tire wear, or the presence of manufacturing faults, results in geometric irregularities of the rim and of the tire which, during use, are manifested as vehicle vibrations.

The need to perform periodic wheel balancing operations suitable for re-establishing optimal vehicle attitude, and overcoming such vibrations, is thus well-known.

Traditional balancing operations require the fitting of weights, generally made of lead, on predetermined points of the wheel and along the rim.

Such operations are usually done using balancing machines comprising a bearing structure supporting wheel grip and rotation means, of the type of a horizontal spindle that can be axially turned by means of motor means and onto which the wheel rim is keyed. Known balancing machines are disclosed in U.S. Patent Application Publication 2007/0069571 A1, published Mar. 29, 2007, and U.S. Patent Application Publication 2008/0053223A; published on Mar. 6, 2008.

The measurement of the wheel unbalance is read during rotation by specific electronic or electro-mechanical devices, such as force transducers, fitted along the horizontal spindle. Normally, each of the measurements is related to a respective angular position of the wheel on the rotation axis.

The fitting of the weights offsets only the effects of the irregularity of the wheel in the distribution of the centrifugal forces during the rotation but, does not, however, solve the problems tied to the geometry defects of the wheel itself.

For this reason, in modern balancing machines, the balancing operation is often preceded by a coupling optimisation procedure between the tire and the rim, in order to reduce the effects of the geometric irregularity of the wheels.

Such optimisation procedure generally contemplates a preliminary measurement phase of the radial deviation of the rim and the tire eccentricity during one or more complete wheel rotations, normally performed by means of suitable measuring sensors with or without contact (e.g., feelers or optical sensors).

After the acquisition of the eccentricity data comes the analysis of the acquired curves and the determination of the eccentricity vectors relating to the rim and the tire.

Such eccentricity vectors are generally calculated starting with the maximum or minimum radial deviation peak values or, alternatively, starting with the first harmonic values of the acquired curves determined according to known mathematical periodical function analysis methods.

The tire is then turned, with respect to the rim, until it reaches an optimal angular position, in which the predetermined eccentricity vectors of the rim and the tire are in contrast with one another so as to minimize the resulting wheel eccentricity vector. These optimisation procedures relating to the coupling between rim and tire nevertheless have a number of drawbacks.

In particular, the use of the eccentricity vectors, determined starting from the peak deviation values or from the first harmonic values of the acquired curves, limits the analysis to a single rim and tire eccentricity component and does not consider the total geometric eccentricities of the wheel.

BRIEF SUMMARY OF THE INVENTION

The main aim of this invention is to identify a method for correcting the eccentricity of a vehicle wheel in balancing machines that minimizes the effects of the irregularities of the wheel as a whole.

Another object of this invention is to provide a method for correcting the eccentricity of a vehicle wheel in balancing machines that overcomes the above-mentioned drawbacks of the known technique by implementing a simple and rational solution, which is easy and effective to use, as well as having a low cost.

The above objects are all achieved by applicant's unique method for correcting the eccentricity of a vehicle wheel in balancing machines or the like, comprising:
  a reading phase for reading the radial eccentricity deviation of the rim of a wheel to be balanced and the radial eccentricity deviation of the tire of said wheel, read at a plurality of predetermined angular positions along the entire outer perimeter of said rim and of said tire;
wherein the method comprises:
  a processing phase of the total radial eccentricity deviation values of said wheel, starting with said radial eccentricity deviations of the rim and of the tire read and according to the angular coupling positions between said rim and said tire;
  a definition phase for defining a geometric irregularity index of said wheel, determined according to the total radial eccentricity deviation values of said wheel and according to the angular coupling position between said rim and said tire;
  a determination phase for determining an optimal coupling angular position between said tire and said rim, selected among all the possible angular coupling positions, in which the value of said index is minimum.

BRIEF DESCRIPTION OF THE DRAWINGS

Further characteristics and advantages of this invention will appear more evident from the description of a preferred embodiment of a method for correcting the eccentricity of a vehicle wheel in balancing machines or the like. The method is illustrated in the accompanying drawings, wherein.

DETAILED DESCRIPTION

Figure 1:
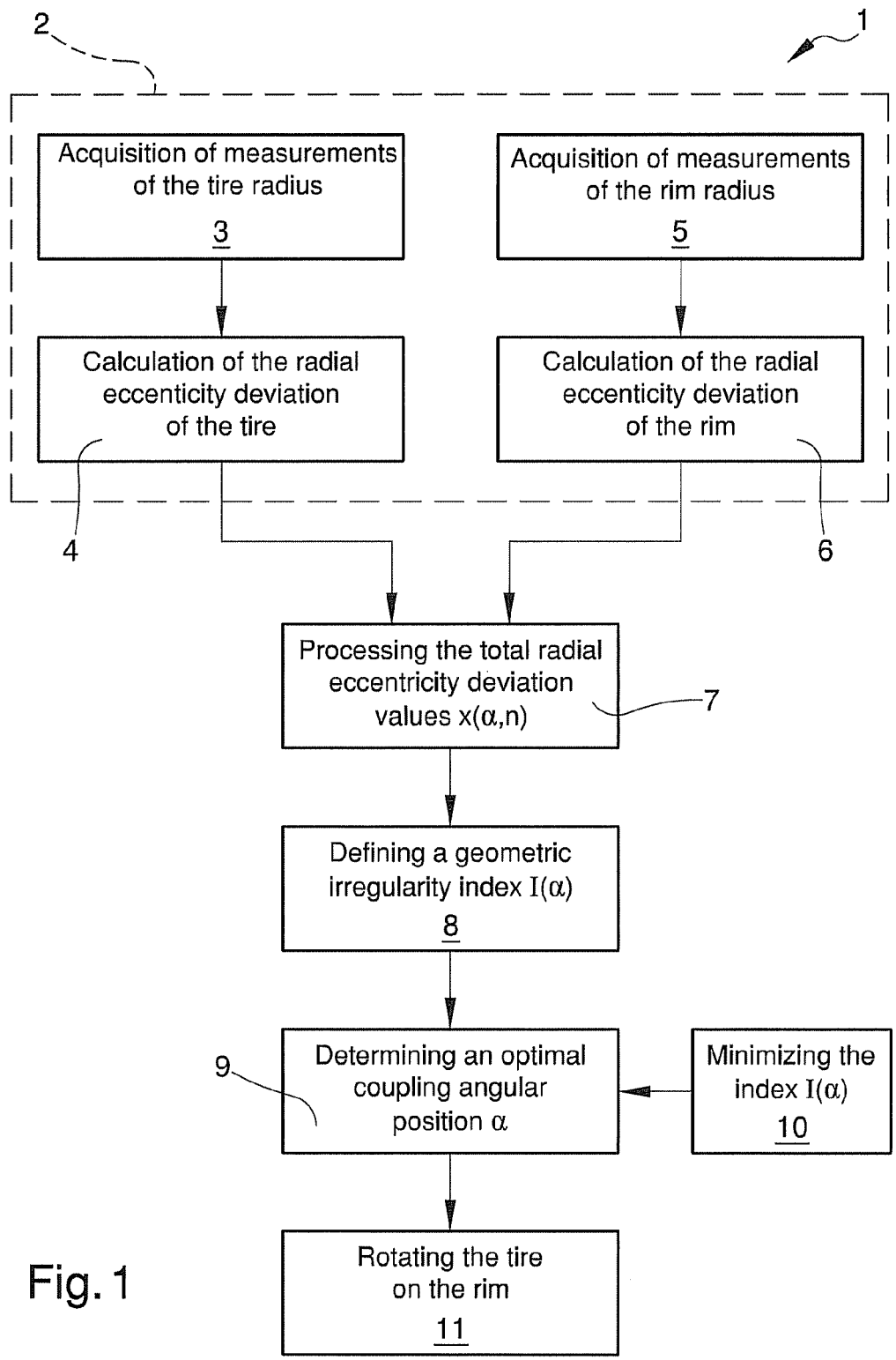
FIG. 1 is a flow diagram illustrating a first embodiment of the method according to the invention.

With particular reference to such figures, a method for correcting the eccentricity of a vehicle wheel, particularly applicable in balancing machines or the like, has been globally indicated by 1.

More specifically, the method 1 can be implemented by means of a software program integrated with the control software of a conventional vehicle wheel balancing machine.

The method 1 comprises a reading phase 2 of the radial eccentricity deviation of the rim of the wheel to be balanced and of the radial eccentricity deviation of the tire of such wheel.

Such deviation values are read at a plurality of predetermined angular positions along the entire outer perimeter of the rim and of the tire during one or more complete wheel rotations.

In particular, according to a first embodiment of the method 1, the reading phase 2 comprises a first acquisition phase 3 of a plurality of measurements of the tire radius, made at the above angular positions and along the entire outer perimeter during at least one complete rotation of the wheel.

The reading phase 2 further comprises a subsequent first calculation phase 4 of the radial eccentricity deviation of the tire determined starting from the plurality of measurements of the radius acquired during the first acquisition phase 3.

Usefully, the first calculation phase can be made by means of the comparison of each of the tire radius measurements with the value of an average reference radius; in particular, such average radius can be determined considering all the acquired tire radius measurements.

Similarly, the reading phase 2 comprises a second acquisition phase 5 of a plurality of measurements of the rim radius, made at the above angular positions and along the entire outer perimeter during at least one complete rotation of the wheel.

The reading phase 2 further comprises a subsequent second calculation phase 6 of the radial eccentricity deviation of the rim determined starting from the plurality of radius measurements acquired during the second acquisition phase 5.

Usefully, the second calculation phase can be effected by comparing each of the rim radius measurements with the value of an average reference radius; in particular, such average radius can be determined considering all the acquired rim radius measurements.

The wheel is fitted turning on grip and rotation means of the balancing machine and the first acquisition phase 3 and the second acquisition phase 5 are made by means of suitable measurement sensors with or without contact such as, e.g., feelers or optical sensors of the commonly used type.

Figure 2:
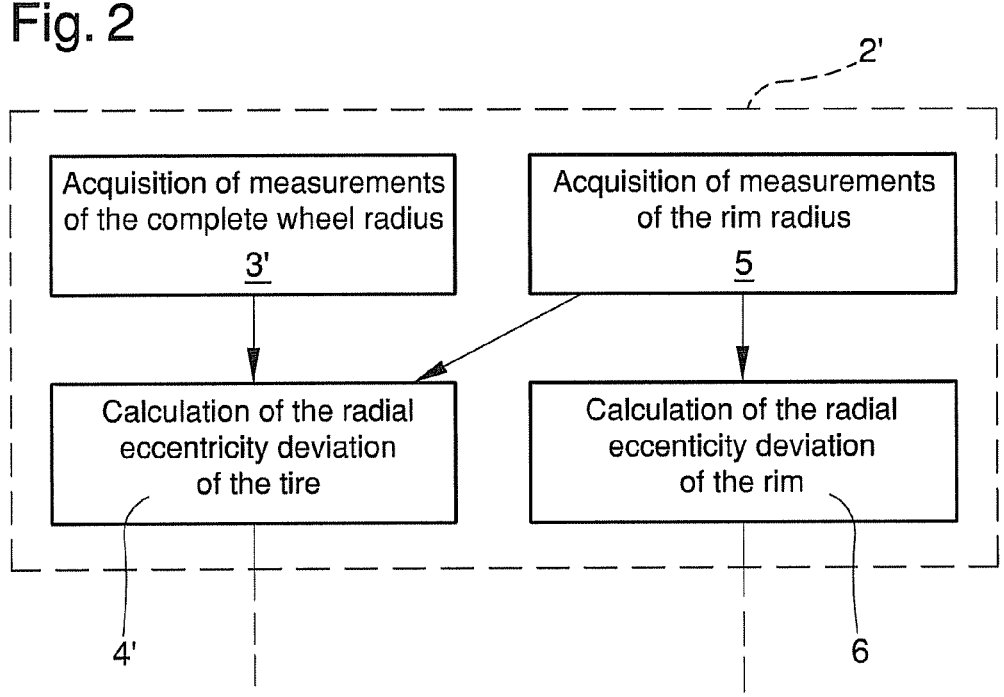
FIG. 2 is a flow diagram illustrating a second embodiment of the method according to the invention.

Optimally, the first acquisition phase 3 and the second acquisition phase 5 can be performed at the same time so as to considerably reduce the overall reading times. FIG. 2 shows a second embodiment of method 1, which finds particular application in providing after-sales services for correcting the wheel eccentricity. The second embodiment of the method points out that the reading phase 2 can be performed on an already-assembled wheel, and need not be performed separately on the wheel and on the tire, as described in the preferred complementation of method 1.

In utilizing method 1 for after-sales service, the rim and the tire radial deviations can be performed by suitably combining, e.g. by difference, the values of the measurements of the radius of the wheel complete with tire and rim, acquired along the entire outer perimeter during at least one complete rotation of the wheel itself, with the measurement values of the rim radius only.

This solution is schematically shown in the FIG. 2, in which the reading phase, indicated generically by the reference 2', comprises a first acquisition phase 3' of a plurality of measurements of the radius of the complete wheel, made at predetermined angular positions and along the entire outer perimeter, during at least one complete rotation of the wheel itself.

By means of the subsequent first calculation phase 4', the radial eccentricity deviation of the tire only is determined, which is obtained by suitably combining, e.g. by difference, the plurality of measurements of the complete wheel radius acquired during the first acquisition phase 3' with the plurality of measurements of the rim radius acquired during the second acquisition phase 5.

Advantageously, the method 1 contemplates a processing phase 7 of the total radial eccentricity deviation values $x(\alpha,n)$ of the wheel, determined for each of the angular positions n of the wheel, starting with the above radial eccentricity deviations of the rim and the tire and according to the possible angular coupling positions $\alpha$ between the rim and the tire.

In particular, it is pointed out that the angular coupling position $\alpha$ coincides with the displacement angle between the rim and the tire and, therefore, varies along with the variation of the angular position of the rim with respect to the angular position of the tire.

For example, by indicating with $$y(\alpha,n), \text{ with } n=0, \ldots, N-1$$

the values of the measurements of the wheel radius calculated at predetermined angular positions n along the entire perimeter of the wheel itself, and according to the angular coupling position $\alpha$ between the rim and the tire, and with $$\bar{y}(\alpha) = \frac{1}{N}\sum_{n=0}^{N-1} y(\alpha, n)$$

the average radius of the wheel determined by the values calculated at the above angular positions n and of the above angular coupling position $\alpha$, then the total radial eccentricity deviation values $x(\alpha,n)$ of the wheel, at the angular positions n can be calculated as $$x(\alpha,n)=y(\alpha,n)-\bar{y}(\alpha) \quad n=0, \ldots, N-1$$

Figure 3:
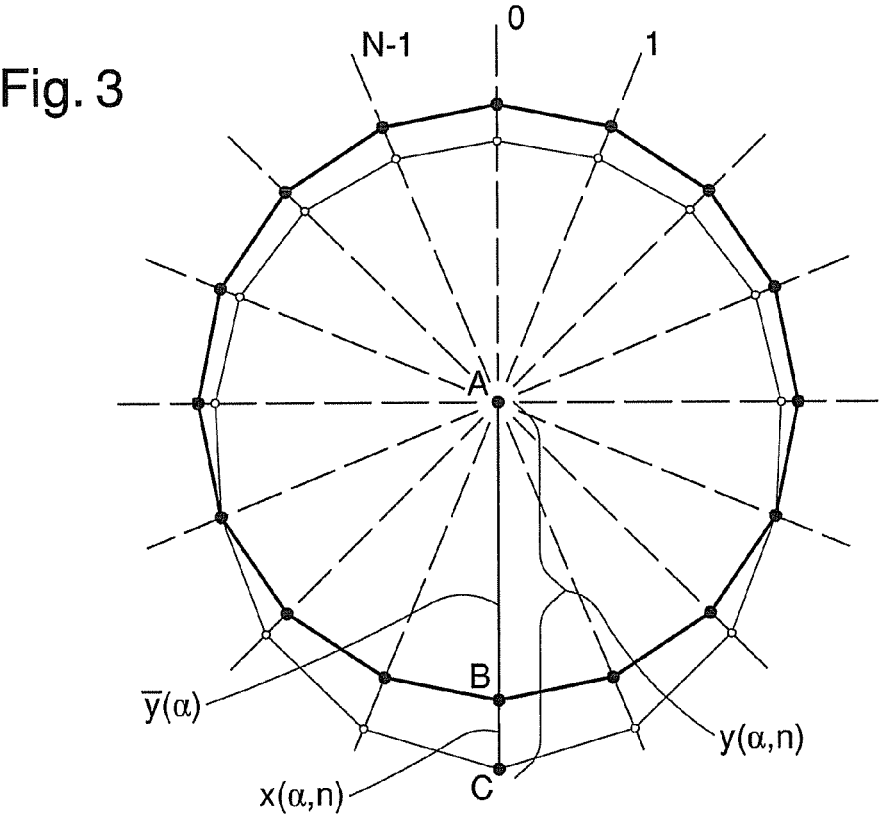
FIG. 3 shows schematically the total radial eccentricity deviation of a wheel calculated according to the invention.

The above values $y(\alpha,n)$, $\bar{y}(\alpha)$ and $x(\alpha,n)$ are shown in FIG. 3 and are defined by the segments AC, AB and BC respectively, determined at each of the angular positions n from 0 to N−1.

Usefully, the method 1 includes a subsequent definition phase 8 of a geometric irregularity index $I(\alpha)$ of the wheel, composed of a positive value determined according to the total radial eccentricity deviation values $x(\alpha,n)$ and according to the angular coupling position $\alpha$ between the rim and the tire.

In a particular, but not limiting, embodiment of the method 1, such index $I(\alpha)$ can be calculated by a suitable positive-definite function, such as e.g. a mathematical norm. In this case, the index $I(\alpha)$ is made, e.g., of the variance of the total radial eccentricity deviation values $x(\alpha,n)$ of the wheel with respect to a perfectly cylindrical wheel centred on the rotation axis.

Consequently, the geometric irregularity index $I(\alpha)$ of the wheel can be defined as $$I(\alpha) = \frac{1}{N}\sum_{n=0}^{N-1} |x(\alpha, n)|^2$$

Alternatively, such index $I(\alpha)$ can be calculated according to the known methods of the analysis of the periodical functions and can be defined, e.g., by a suitable function of the first harmonic and of the harmonics of higher order relating to the curve of the total radial eccentricity deviation x(α,n) of the wheel.

In this case, by indicating with $$X(\alpha,k) k=0,\ldots,N-1$$

the discrete Fourier transform on N points of the sequence x(α,n) described above, the geometric irregularity index I(α) of the wheel can be defined, e.g., as $$I(\alpha) = \frac{1}{N^2} \sum_{k=1}^{N-1} |X(\alpha, k)|^2$$

being X(α,0)=0 in terms of how the total radial deviation x(α,n) has been defined.

Usefully, in the case of the quantity of the acquired data being high, considering in the definition of the index I(α) only some of the harmonics of an order higher than the first, we can obtain a good approximation of the geometric irregularity of the wheel while, at the same time, simplifying the calculation process.

The method 1 further comprises, or includes, a determination phase 9 of an optimal coupling angular position α between the tire and the rim.

Such optimal coupling angular position α is selected from among all the possible angular coupling positions α, and is such that the value of the above geometric irregularity index I(α) appears as a minimum. Consequently, the difference of the total radial eccentricity deviation x(α,n) of the wheel is minimum with respect to the ideal reference wheel.

In particular, the determination phase 9 comprises a minimization phase 10 of the above index I(α), e.g., by means of the application of the mathematical principle of the square minimums.

The application of different minimization principles cannot however be ruled out, based, e.g., on the minimization of the sum of the absolute values of the eccentricity radial variations or, again, on the minimization of the maximum absolute value of the deviations.

The method 1 then comprises a concluding rotation phase 11 of the tire on the rim until the above optimal angular position is reached.

Once all the phases, or steps, of method 1 have been concluded, the traditional wheel balancing operations, by utilizing a known balancing machine, can be performed in an optimal way.

It has, in fact, been ascertained that the described invention achieves its proposed objects. In particular the fact is emphasized that the method permits reducing to the utmost the overall contribution of all the geometric irregularities of the rim and of the tire.

The invention thus conceived is susceptible to numerous modifications and variations, all of which falling within the scope of the inventive concept.

Furthermore all the details can be replaced with others that are technically equivalent.

In practice, the materials used, as well as the contingent shapes and dimensions, may be varied to meet operating requirements. Consequently, the appended claims should be broadly construed commensurate with the significant advances realized by the applicants' unique methodology, and should not be restricted to their literal terms.

The invention claimed is:

1. A method for correcting the eccentricity of a vehicle wheel in balancing machines, comprising:
    a reading phase for reading the radial eccentricity deviation of the rim of a wheel to be balanced and the radial eccentricity deviation of the tire of said wheel, read at a plurality of predetermined angular positions along the entire outer perimeter of said rim and of said tire;
    wherein the method comprises:
        a processing phase of the total radial eccentricity deviation values of said wheel, starting with said radial eccentricity deviations of the rim and of the tire read and according to the angular coupling positions between said rim and said tire;
        a definition phase for defining a geometric irregularity index of said wheel, determined according to the total radial eccentricity deviation values of said wheel and according to the angular coupling position between said rim and said tire;
        a determination phase for determining an optimal coupling angular position between said tire and said rim, selected among all the possible angular coupling positions, in which the value of said index is minimum;
    said index being calculated starting from the values of the harmonics relating to the total radial deviation of the wheel and determined accordingly to the mathematical function analysis method,
    said harmonics comprising the first harmonic or at least one harmonic of higher order.

2. The method according to claim 1, wherein said index is composed of a continuous positive variable.

3. The method according to claim 1, wherein said index is defined according to the following formula $$I(\alpha) = \frac{1}{N^2} \sum_{k=1}^{N-1} |X(\alpha, k)|^2$$

where X(α, k) is the discrete Fourier transform on N points of said total radial eccentricity deviation, and
α is the angular coupling position between said rim and said tire.

4. The method according to claim 1, wherein said total radial eccentricity deviation is processed according to the following formula $$x(\alpha, n) = y(\alpha, n) - \overline{y}(\alpha) \text{ with } n=0,\ldots,N-1$$

where y(α, n) is the calculated radius of the wheel,
$\overline{y}(\alpha)$ is the average radius of the wheel,
α is the angular coupling position between said rim and said tire,
and
n are the angular reading positions on the rim and on the tire of said wheel.

5. The method according to claim 1, wherein said determination phase of the optimal coupling angular position comprises minimizing said index.

6. The method according to claim 5, wherein said minimizing comprises the application of the mathematical principle of the square minimums.

7. The method according to claim 1, wherein said reading phase comprises a first acquisition phase of a plurality of measurements of the radius of said tire, at said angular positions and along the entire outer perimeter.

8. The method according to claim 7, wherein said reading phase comprises a first calculation phase of the radial eccentricity deviation of said tire starting from said plurality of acquired measurements of the radius of the tire.

9. The method according to claims 8, wherein said first calculation phase comprises comparing each of said tire radius measurements with an average reference radius obtained starting from all the radius measurements of said tire.

10. The method according to claim 1, wherein said reading phase comprises a second acquisition phase of a plurality of measurements of the radius of said rim, at said angular positions and along the entire outer perimeter.

11. The method according to claim 10, wherein said reading phase comprises a second calculation phase of the radial eccentricity deviation of said rim starting from said plurality of acquired measurements of the radius of the rim.

12. The method according to claim 11, wherein said second calculation phase comprises comparing each of said rim radius measurements with an average reference radius obtained starting from all the radius measurements of said rim.

13. The method according to claim 1, wherein said reading phase comprises a first acquisition phase of a plurality of measurements of the radius of said wheel, at said angular positions and along the entire outer perimeter.

14. The method according to claim 13, wherein said reading phase comprises:
a second acquisition phase of a plurality of measurements of the radius of said rim, at said angular positions and along the entire outer perimeter; and
a first calculation phase of the radial eccentricity deviation of said tire starting from said plurality of acquired measurements of the radius of said wheel and from said plurality of acquired measurements of the radius of said rim.

15. The method according to claim 1, wherein the method comprises turning said tire onto said rim until it reaches said optimal coupling angular position.

16. A method for correcting the eccentricity of a vehicle wheel in a balancing machine, said wheel comprising a rim with spaced upward flanges, and a tire seated between said flanges, comprising the steps of:
sensing the radial eccentricity deviation of the rim of a wheel to be balanced and the radial eccentricity of tire of said wheel at a plurality of predetermined angular positions along the outer perimeter of said rim and of said tire,
processing the total eccentricity deviation value of said wheel, starting with said radial eccentricity deviations of the rim and of the tire, as sensed, and according to the angular coupling position between said rim and said tire;
computing a geometric irregularity index for said wheel, based upon the total eccentricity deviation values of said wheel and according to the angular coupling position between said tire and said rim,
said index being computed starting from the values of the harmonics relating to the total radial deviation of the wheel and determined according to the mathematical periodical function analysis, and
determining an optimal coupling angular position between said tire and said rim, said optimal angular position corresponding to a minimum value for said geometric irregularity index.

17. The method according to claim 16 wherein said harmonics comprise the first harmonic and at least one harmonic of a higher order.

\* \* \* \* \*